US012799967B2

(12) United States Patent
Haylock et al.

(10) Patent No.: US 12,799,967 B2
(45) Date of Patent: Nov. 17, 2026

(54) FLUSH BLIND FASTENER

(71) Applicant: Howmet Aerospace Inc., Pittsburgh, PA (US)

(72) Inventors: Luke Haylock, Culver City, CA (US); Todd Balls, Pittsburgh, PA (US); Junjie Huang, Pittsburgh, PA (US); David Jonathan Gonzalez Campos, Pittsburgh, PA (US)

(73) Assignee: Howmet Aerospace Inc., Pittsburgh, PA (US)

( * ) Notice: Subject to any disclaimer, the term of this patent is extended or adjusted under 35 U.S.C. 154(b) by 392 days.

(21) Appl. No.: 18/441,865

(22) Filed: Feb. 14, 2024

(65) Prior Publication Data

US 2024/0183379 A1 Jun. 6, 2024

Related U.S. Application Data

(63) Continuation of application No. PCT/US2022/042760, filed on Sep. 7, 2022.

(60) Provisional application No. 63/241,368, filed on Sep. 7, 2021.

(51) Int. Cl.
*F16B 19/10* (2006.01)
*B25B 27/00* (2006.01)

(52) U.S. Cl.
CPC ...... *F16B 19/1072* (2013.01); *B25B 27/0007* (2013.01)

(58) Field of Classification Search
CPC .......................... F16B 13/066; F16B 19/1072
USPC .......................................... 411/55, 187, 188
See application file for complete search history.

(56) References Cited

U.S. PATENT DOCUMENTS

| | | | |
|---|---|---|---|
| 2,324,142 A | | 7/1943 | Eklund |
| 2,385,886 A | | 10/1945 | Shaff |
| 2,415,560 A | | 2/1947 | Higley |
| 2,863,351 A | | 12/1958 | Vaughn |
| 2,950,602 A | | 8/1960 | Lang |
| 2,971,425 A | | 2/1961 | Blakeley |
| 3,107,572 A | | 10/1963 | Query |
| 3,277,771 A | | 10/1966 | Query |
| 3,345,900 A | | 10/1967 | Query |
| 3,443,474 A | | 5/1969 | Bergere et al. |
| 3,493,254 A | * | 2/1970 | Summerlin ......... F16B 19/1072 411/39 |

(Continued)

FOREIGN PATENT DOCUMENTS

| | | |
|---|---|---|
| CA | 2003735 C | 1/2000 |
| CA | 2868329 C | 5/2015 |

(Continued)

*Primary Examiner* — Flemming Saether
(74) *Attorney, Agent, or Firm* — Greenberg Traurig, LLP

(57) ABSTRACT

A system includes a fastener and a fastener installation tool. The fastener includes a sleeve having a tubular portion with an internal threaded portion having an internal thread, and a head. The head of the sleeve is configured to be installed in an accessible hole in a workpiece having a surface. The fastener includes a pin member having a threaded portion with an external thread. The pin member is disposed within the sleeve and the external thread of the pin member is configured to threadedly engage the internal thread of the sleeve. The fastener installation tool includes a nosepiece having a face configured to engage the head of the sleeve without the face contacting the surface of the workpiece.

20 Claims, 10 Drawing Sheets

(56) References Cited

U.S. PATENT DOCUMENTS

| | | | | |
|---|---|---|---|---|
| 3,653,294 | A | 4/1972 | Nason | |
| 3,834,270 | A | 9/1974 | Triplett et al. | |
| 3,866,998 | A | 2/1975 | Iantorno | |
| 3,942,407 | A | 3/1976 | Mortensen | |
| 4,312,613 | A | 1/1982 | Binns | |
| 4,400,960 | A * | 8/1983 | Martin | B25B 31/00 72/114 |
| 4,499,647 | A * | 2/1985 | Sakamura | B23P 19/062 29/524.1 |
| 4,557,649 | A * | 12/1985 | Jeal | F16B 29/00 411/181 |
| 4,579,491 | A | 4/1986 | Kull | |
| 4,659,271 | A | 4/1987 | Pratt et al. | |
| 4,772,167 | A * | 9/1988 | Beals | F16B 19/1063 411/34 |
| 4,789,283 | A | 12/1988 | Crawford | |
| 4,832,548 | A | 5/1989 | Strobel | |
| 4,844,673 | A | 7/1989 | Kendall | |
| 4,865,499 | A | 9/1989 | Lacey | |
| 4,919,577 | A * | 4/1990 | Binns | F16B 19/1063 411/34 |
| 4,950,115 | A | 8/1990 | Sadri | |
| 5,023,983 | A | 6/1991 | Winkler et al. | |
| 5,252,014 | A | 10/1993 | Andrews | |
| 5,498,110 | A | 3/1996 | Stencel et al. | |
| 5,634,751 | A | 6/1997 | Stencel et al. | |
| 5,816,761 | A | 10/1998 | Cassatt et al. | |
| 5,913,648 | A | 6/1999 | Lin | |
| 6,036,418 | A | 3/2000 | Stencel et al. | |
| 6,213,698 | B1 | 4/2001 | Cosenza | |
| 6,394,725 | B1 * | 5/2002 | Dicke | F16B 35/065 411/188 |
| 6,868,757 | B2 | 3/2005 | Hufnagl et al. | |
| 7,033,120 | B2 | 4/2006 | Hufnagl et al. | |
| 7,150,594 | B2 | 12/2006 | Keener | |
| 7,303,366 | B2 * | 12/2007 | Smith | F16B 19/1072 411/501 |
| 7,308,842 | B2 | 12/2007 | Hufnagl et al. | |
| 8,297,897 | B2 | 10/2012 | Auriol et al. | |
| 8,322,015 | B2 | 12/2012 | Pratt et al. | |
| 8,348,566 | B2 | 1/2013 | Pratt | |
| 8,777,533 | B2 | 7/2014 | Hufnagl et al. | |
| 8,979,453 | B2 | 3/2015 | Hufnagl et al. | |
| 9,163,652 | B2 * | 10/2015 | Tuery | F16B 19/1072 |
| 10,006,478 | B2 | 6/2018 | Hufnagl et al. | |
| 10,704,582 | B2 | 7/2020 | Hufnagl et al. | |
| 11,143,226 | B2 * | 10/2021 | Vovan | F16B 13/061 |
| 11,421,724 | B2 * | 8/2022 | Quaresma | F16B 19/1063 |
| 2013/0061452 | A1 * | 3/2013 | Pratt | F16B 19/1072 411/34 |
| 2015/0196951 | A1 | 7/2015 | Bigot et al. | |

FOREIGN PATENT DOCUMENTS

| | | | |
|---|---|---|---|
| CN | 1791493 | A | 6/2006 |
| CN | 101668956 | A | 3/2010 |
| CN | 203176114 | U | 9/2013 |
| CN | 103375470 | A | 10/2013 |
| CN | 203321996 | U | 12/2013 |
| CN | 205744760 | U | 11/2016 |
| DE | 3923263 | A1 | 1/1991 |
| EP | 0639719 | A1 | 2/1995 |
| EP | 1075888 | A1 | 2/2001 |
| EP | 1248001 | A2 | 10/2002 |
| FR | 3117049 | A1 | 6/2022 |
| JP | 2010537139 | A | 12/2010 |
| JP | 5878672 | B2 | 3/2016 |
| TW | 557338 | B | 10/2003 |
| WO | 2007100906 | A2 | 9/2007 |

* cited by examiner

FLUSH BLIND FASTENER

CROSS-REFERENCE TO RELATED APPLICATION

This application is a continuation application that relates to and claims the benefit of commonly-owned, co-pending PCT International Application No. PCT/US2022/042760 entitled "FLUSH BLIND FASTENER," filed Sep. 7, 2022, which claims priority to and the benefit of commonly owned U.S. Provisional Patent Application Ser. No. 63/241,368 entitled "FLUSH BLIND FASTENER," filed Sep. 7, 2021, the entireties of each of which is incorporated herein by reference.

FIELD OF THE INVENTION

The present invention relates to fasteners and, more particularly, to blind fasteners for securing a plurality of workpieces together.

BACKGROUND

Blind fasteners are commonly used to secure a plurality of workpieces together when it is difficult or impossible to access a blind side of one of the workpieces.

SUMMARY

In some embodiments, a system includes a fastener including, a sleeve having a tubular portion, wherein the tubular portion includes an internal threaded portion having an internal thread, and a head, wherein the head of the sleeve includes a first planar surface, wherein the first planar surface is substantially flat and has no recesses therein, wherein the head of the sleeve is configured to be installed in an accessible hole in a workpiece having a surface, and a pin member having a threaded portion, wherein the threaded portion includes an external thread, wherein the pin member is configured to be disposed within the sleeve, and wherein the external thread of the pin member is configured to threadedly engage the internal thread of the sleeve; and a fastener installation tool including a nosepiece having a face, and at least one protrusion extending from the face, wherein the at least one protrusion is configured to engage and removably embed within the first planar surface of the head of the sleeve to prevent the sleeve from rotating relative to the workpiece.

In some embodiments, the at least one protrusion includes a plurality of protrusions. In some embodiments, the plurality of protrusions includes at least two of the protrusions. In some embodiments, the plurality of protrusions includes at least three to at least six protrusions. In some embodiments, the plurality of protrusions is circumferentially spaced from one another. In some embodiments, the at least one protrusion includes a tip, and wherein the tip extends from the face by a first distance. In some embodiments, the first distance is 300 μm to 500 μm. In some embodiments, the tip is pointed. In some embodiments, the at least one protrusion includes a first side extending from the face to the tip, and wherein the first side is radiused. In some embodiments, the tip includes a second side extending from the face to the tip, and wherein the second side extends at an angle of 30° to 60° relative to a normal direction from the face of the nosepiece.

In some embodiments, the nosepiece of the fastener installation tool is composed of a first material, and wherein the sleeve is composed of a second material. In some embodiments, the first material is harder than the second material. In some embodiments, the first material is aluminum. In some embodiments, the first material is an aluminum alloy. In some embodiments, the first material is steel. In some embodiments, the second material is aluminum. In some embodiments, the second material is an aluminum alloy. In some embodiments, the second material is stainless steel. In some embodiments, the second material is a nickel-copper alloy.

In some embodiments, a fastener includes a sleeve having a tubular portion, wherein the tubular portion includes an internal threaded portion having an internal thread, and a head, wherein the head includes a first planar surface, wherein the first planar surface is substantially flat and has no recesses, wherein the head of the sleeve is configured to be installed in an accessible hole in a workpiece having a surface; and a pin member having a threaded portion, wherein the threaded portion includes an external thread, wherein the pin member is configured to be disposed within the sleeve, and wherein the external thread of the pin member is configured to threadedly engage the internal thread of the sleeve, and wherein the first planar surface of the head of the sleeve is configured to be engaged by and removably receive therein at least one protrusion of a nosepiece of a fastener installation tool to prevent the sleeve from rotating relative to the workpiece.

BRIEF DESCRIPTION OF THE DRAWINGS

References are made to the accompanying drawings that form a part of this disclosure and that illustrate embodiments in which the systems and methods described in this specification can be practiced.

DETAILED DESCRIPTION

Embodiments of this disclosure provide a fastener having a sleeve with a head that includes a planar surface. In some embodiments, the head of the sleeve does not include any recesses. In some embodiments, the nosepiece of a corresponding fastener installation tool has a planar surface. In some embodiments, the planar surface of the nosepiece of the fastener installation tool engages the planar surface of the head of the sleeve and acts as a clutch to hold the sleeve stationary during actuation of the fastener installation tool. In some embodiments, the fastener installation tool utilizes frictional engagement between the head of the sleeve and the nosepiece of the fastener installation tool to prevent the sleeve from rotating relative to the workpieces during installation of the fastener.

In some embodiments, the planar surface of the nosepiece of the fastener installation tool is configured to include at least one protrusion. In some embodiments, the at least one protrusion is sufficiently hard to form an indent into the planar surface of the head of the sleeve and, in addition to frictional engagement between the fastener installation tool and the sleeve, form an indentation into the sleeve that maintains the sleeve in place without rotating relative to the workpieces during installation of the fastener. In some embodiments, a depth of the indentation is sufficiently small that the surface of the head of the sleeve is substantially planar. In some embodiments, the depth is such that with a single post-installation step, the indentations can be smoothed.

Figure 1:
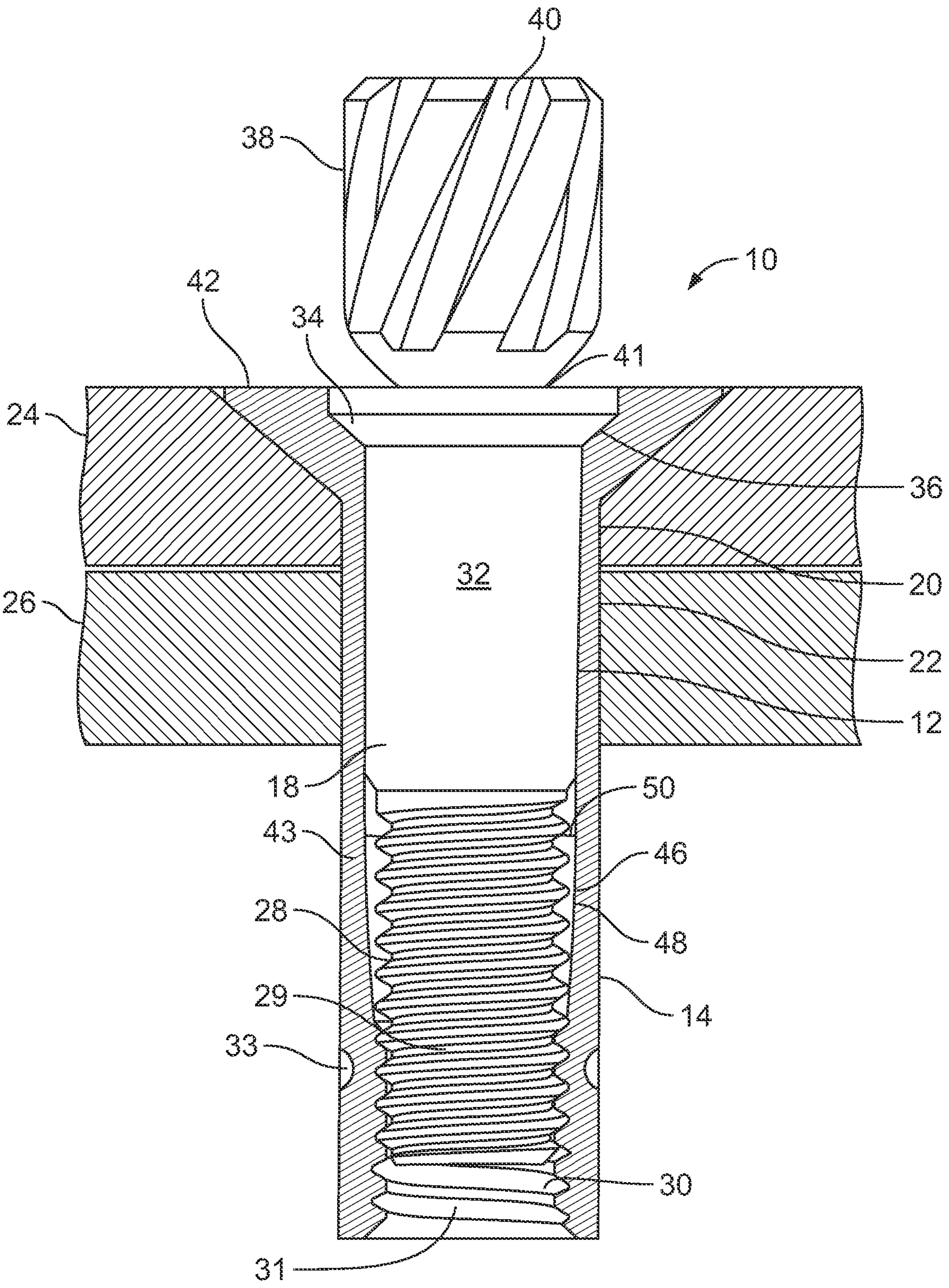
FIG. 1 shows a side cross-sectional view of a fastener, according to some embodiments.
Figure 2:
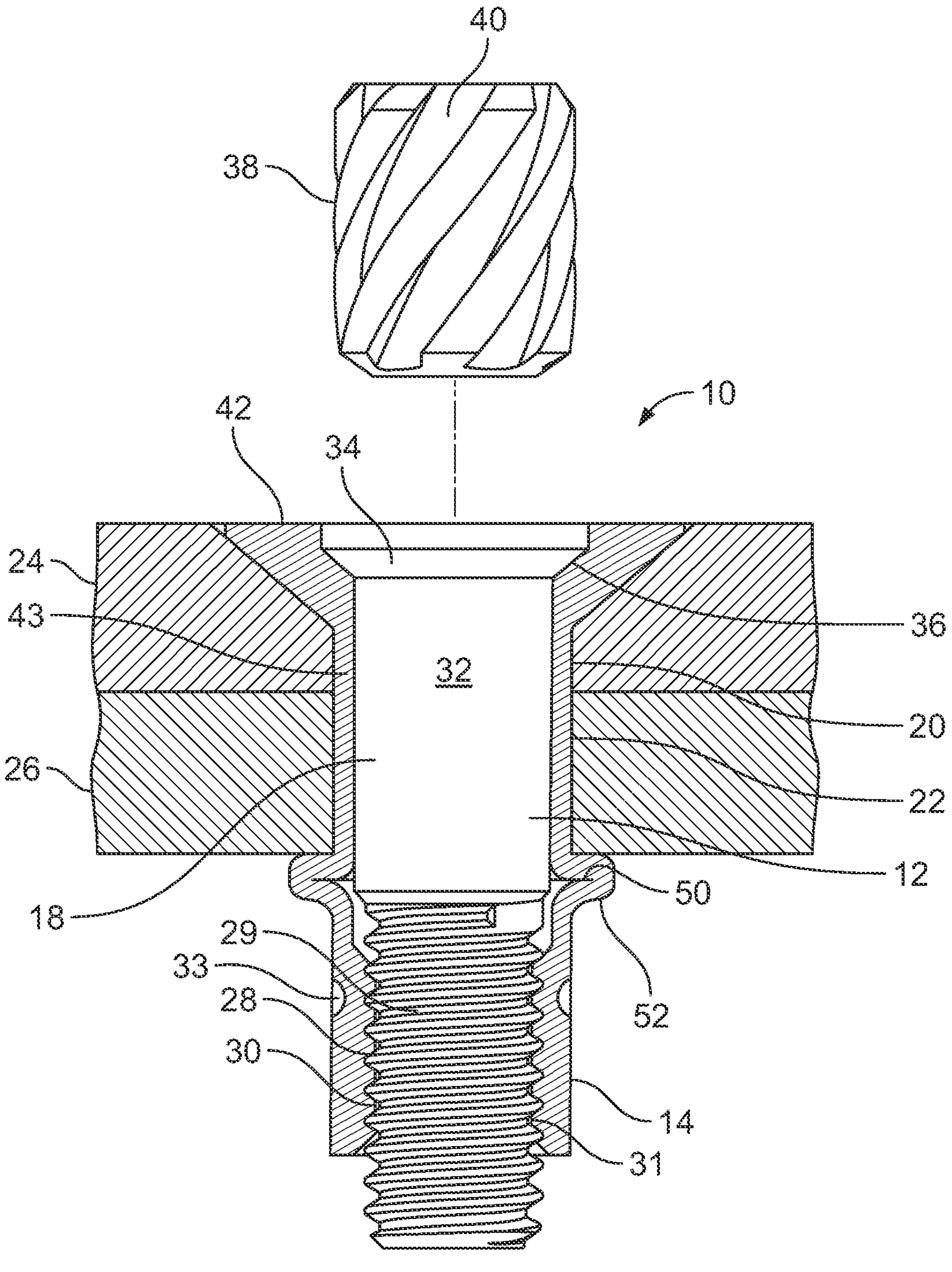
FIG. 2 shows a side cross-sectional view of the fastener shown in FIG. 1 with a second head employed by the fastener being removed therefrom, according to some embodiments.

Referring to FIGS. 1 and 2, in some embodiments, a fastener 10 includes a pin member 12 and a sleeve 14 that is sized and shaped to receive the pin member 12. In some embodiments, the pin member 12 is disposed within the sleeve 14 in a manner to be described hereinafter. In some embodiments, the pin member 12 is a bolt. In some embodiments, the pin member 12 is a screw. In some embodiments, the pin member 12 is a spindle. In some embodiments, the pin member 12 is a stem. In some embodiments, the sleeve 14 is a bushing. In some embodiments, the sleeve 14 is a nut. In some embodiments, the sleeve 14 is a nut body.

In some embodiments, the pin member 12 includes an elongated shank 18. In some embodiments, the elongated shank 18 is configured to extend through hole 20 and hole 22 in workpiece 24 and workpiece 26, respectively, to be secured together. In some embodiments, each of the workpieces 24, 26 is composed of metal. In some embodiments, each of the workpieces 24, 26 is composed of aluminum. In some embodiments, each of the workpieces 24, 26 is composed of an aluminum alloy. In some embodiments, each of the workpieces 24, 26 is composed of a composite material. In some embodiments, each of the workpieces 24, 26 is composed of a substantially composite material. In some embodiments, the workpiece 24 is an accessible side workpiece. In some embodiments, the workpiece 26 is a blind side workpiece. In some embodiments, the hole 20 and the hole 22 are aligned with one another, such that the fastener 10 can be received therein. In some embodiments, the pin member 12 includes a threaded portion 28 having an external thread 29 at one end of the elongated shank 18. In some embodiments, the external thread 29 is configured to threadedly engage an internal thread 31 of an internal threaded portion 30 of the sleeve 14. In some embodiments, the internal thread 31 is an integral component of the sleeve 14. In some embodiments, only a portion of the sleeve 14 is threaded with the internal thread 31 prior to installation. In some embodiments, the elongated shank 18 of the pin member 12 includes a smooth cylindrical shank portion 32 that is adjacent to the threaded portion 28. In some embodiments, the threaded portion 28 of the elongated shank 18 has a diameter that is less than a diameter of the smooth cylindrical shank portion 32. In some embodiments, the pin member 12 includes a first head 34 adjacent to the smooth cylindrical shank portion 32. In some embodiments, the first head 34 is configured be seated on an annular, outwardly facing seat 36 at the outer end of the sleeve 14. In some embodiments, the first head 34 is frustoconical and the seat 36 is complementarily tapered so that the first head 34 of the pin member 12 is countersunk into the sleeve 14.

In some embodiments, adjacent to the first head 34 and also forming a portion of the pin member 12 is a second head 38. In some embodiments, the second head 38 includes splines 40. In some embodiments, the splines 40 are configured to be engaged by a suitable driver attached to a fastener installation tool. In some embodiments, between the first head 34 and the second head 38 is a breakneck portion 41. In some embodiments, the breakneck portion 41 defines the weakest point of the pin member 12 that is configured to fracture in torsional shear in response to the rotational force applied to the second head 38 after the fastener 10 has been set, thereby providing the first head 34 of the pin member 12 with a flush configuration relative to the sleeve 14 after the fastener 10 has been set in an installed position.

In some embodiments, the sleeve 14 includes a tubular portion 43. In some embodiments, the tubular portion 43 has a tubular shape with a smooth exterior surface. In some embodiments, the tubular portion 43 includes a thread lock 33. In some embodiments, the thread lock 33 is formed by locally deforming a portion of the tubular portion 43 of the sleeve 14. In some embodiments, the thread lock 33 extends annularly. In some embodiments, the thread lock 33 is configured to provide resistance to vibration induced loosening of the fastener 10 and prevent unscrewing of the pin member 12 and the sleeve 14.

In some embodiments, there is a clearance fit between the tubular portion 43 and the walls of the hole 20 and the hole 22 of the workpiece 24 and the workpiece 26, respectively. In some embodiments, there is an interference fit between the tubular portion 43 and the walls of the hole 20 and the hole 22 of the workpiece 24 and the workpiece 26, respectively.

In some embodiments, the sleeve 14 has a head 42 at one end thereof. In some embodiments, the head 42 is sunk flush with an outer surface of the workpiece 24. In some embodiments, the head 42 is a rounded head. In some embodiments, the head 42 is a hex head. In some embodiments, the head 42 has other suitable shapes known in the fastener art. In some embodiments, the internal threaded portion 30 has a greater thickness than an internal smooth portion 46 of the sleeve 14. In some embodiments, the wall thickness of the internal smooth portion 46 is greatest adjacent to the internal threaded portion 30. In some embodiments, the thickness of the internal smooth portion 46 is gradually reduced along a tapered section 48 of the sleeve 14 to a step 50. In some embodiments, the step 50 is located outside the blindside of the workpiece 26 when the fastener 10 is in its installed position. In some embodiments, at the step 50, the wall thickness of the internal smooth portion 46 of the sleeve 14 remains substantially the same until reaching the head 42 of the sleeve 14. In some embodiments, the tapered section 48 of the sleeve 14 is configured to form a bulb 52 when the fastener 10 is in its installed position within the workpieces 24, 26. In some embodiments, a portion of the tubular portion 43 of the sleeve 14 is locally induction annealed in order to facilitate formation of the bulb 52. In some embodiments, the tapered section 48 facilitates formation of the bulb 52 against the blindside workpiece 26 in substantially all grip ranges of the fastener 10. In some embodiments, the thickness of the internal smooth portion 46 is abruptly reduced by the step 50 in the sleeve 14 to a wall thickness that remains substantially the same until reaching the head 42 of the sleeve 14. In some embodiments, the internal smooth portion 46 of the sleeve 14 adjacent to the outer surface of the workpiece 26 with the reduced wall thickness relative to the internal threaded portion 30 is locally induction annealed in order to facilitate formation of the bulb 52.

In some embodiments, during installation of the fastener 10, rotation of the pin member 12 relative to the sleeve 14 causes the engagement of the external thread 29 of the threaded portion 28 of the pin member 12 and the internal thread 31 of the internal threaded portion 30 of the sleeve 14. In some embodiments, the engagement of the threaded portion 28 of the pin member 12 and the internal threaded portion 30 of the sleeve 14 forces the sleeve 14 to buckle and move toward the blindside workpiece 26 to form the bulb 52. In some embodiments, the formation of the bulb 52 secures the workpiece 24 and the workpiece 26 together. In some embodiments, the fastener 10 is unable to move in either direction (e.g., toward the workpiece 24 or away from the workpiece 24), due to the presence of the first head 42 of the pin member 12 and the first head 34 of the sleeve 14 on the workpiece 24 and the bulb 52 on the workpiece 26.

Figure 2A:
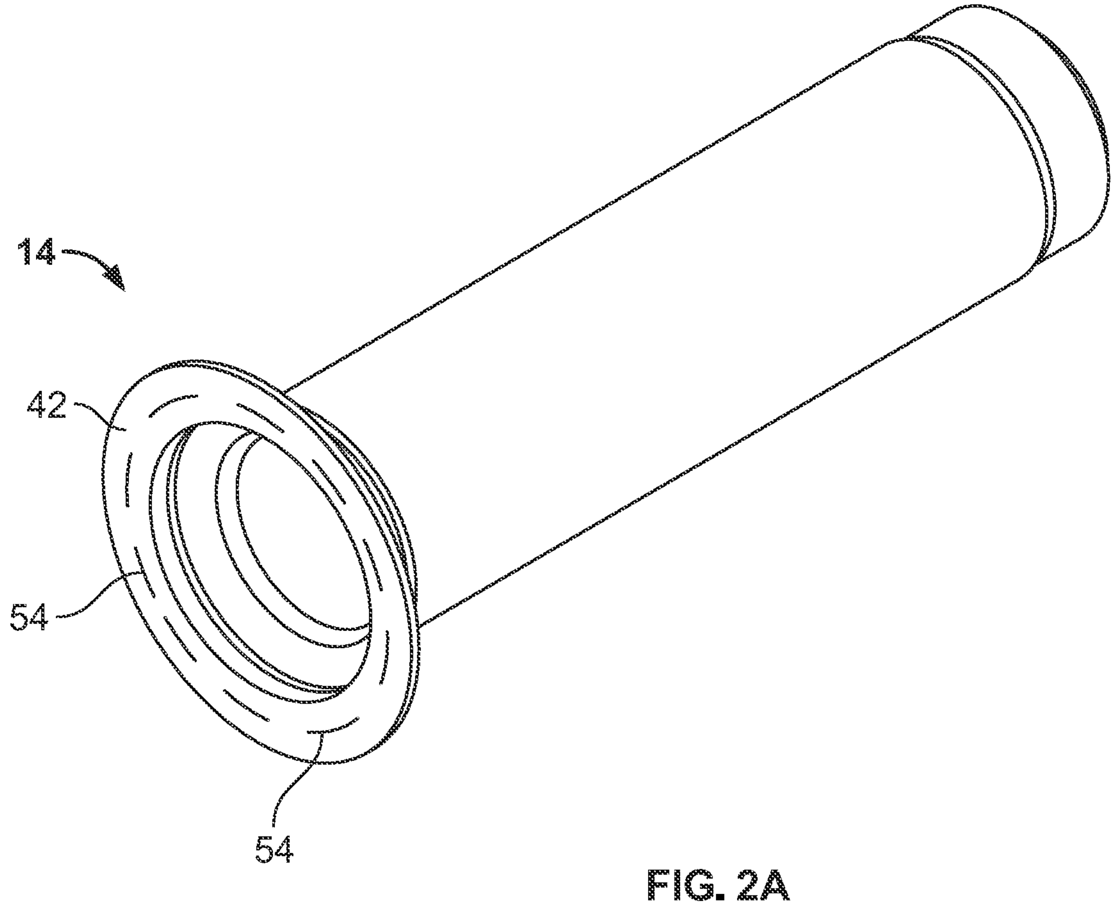
FIG. 2A is a perspective view of some embodiments of a sleeve employed by the fastener shown in FIG. 1.

In some embodiments, the head 42 of the sleeve 14 is machined. In some embodiments, the head 42 of the sleeve 14 is machined by a machining tool. Referring to FIG. 2A, in some embodiments, the machining tool leaves circular marks 54 in the head 42 of the sleeve 14. In some embodiments, the machining of the marks 54 in the head 42 includes concurrently machining the sleeve 14 and the breakneck portion 41 of the pin member 12 in a process which involves rotating a cutting tool simultaneously with rotation of the sleeve 14. In some embodiments, this approach can be referred to as trochoidal turning and, in some embodiments, produces the circular, trochoidal machine marks 54 instead of spiral marks typical of turning. In some embodiments, the marks 54 increase the friction between two surfaces, which in turn increases the clutching torque. In some embodiments, rotation speed of the machining tool can be selected to optimize the pattern of the marks 54. In some embodiments, the marks 54 are characteristic of milling, but in some embodiments can be employed with lathe turning.

Figure 3:
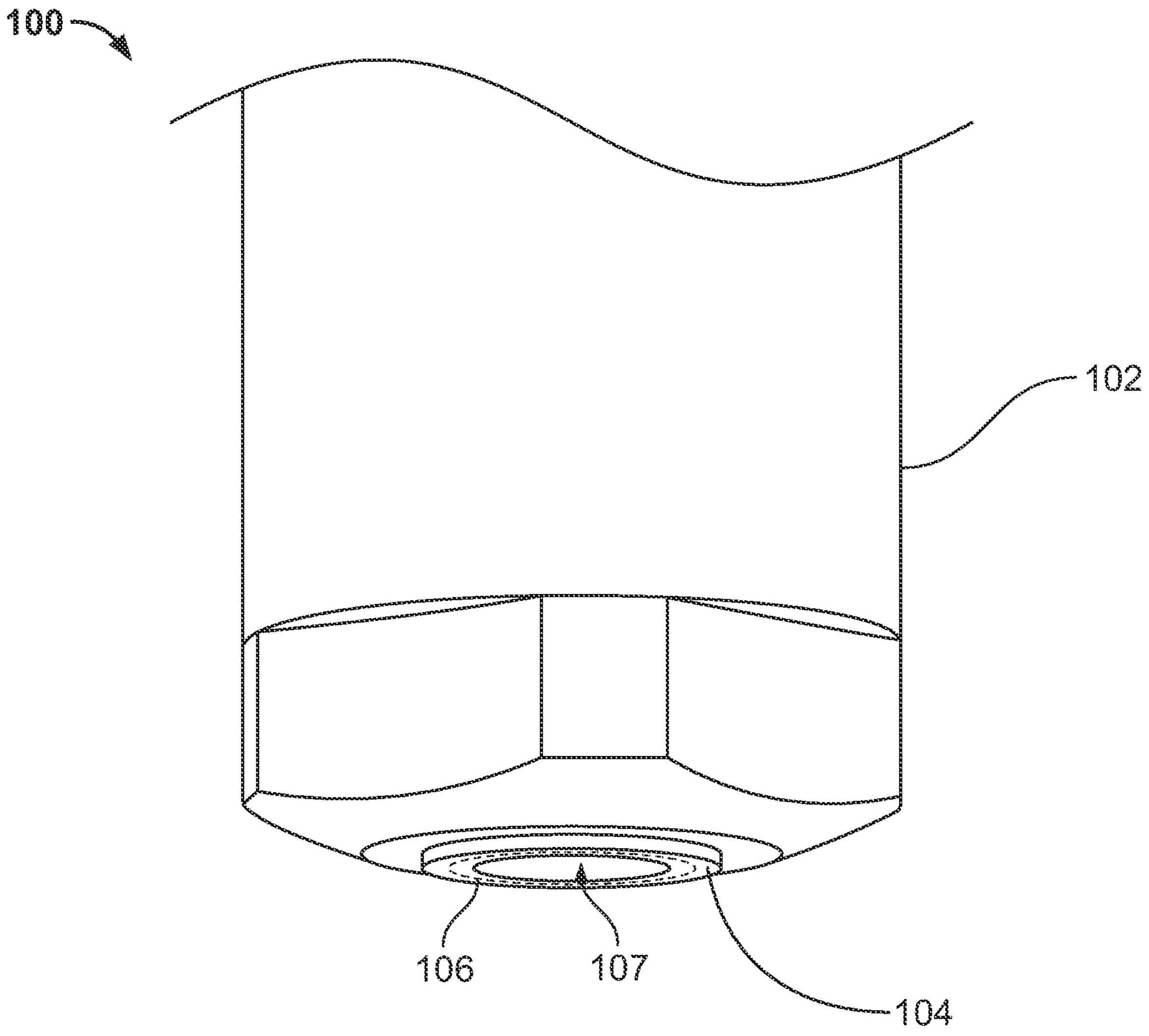
FIG. 3 shows a bottom perspective view of a fastener installation tool for a fastener, according to some embodiments.
Figure 4:
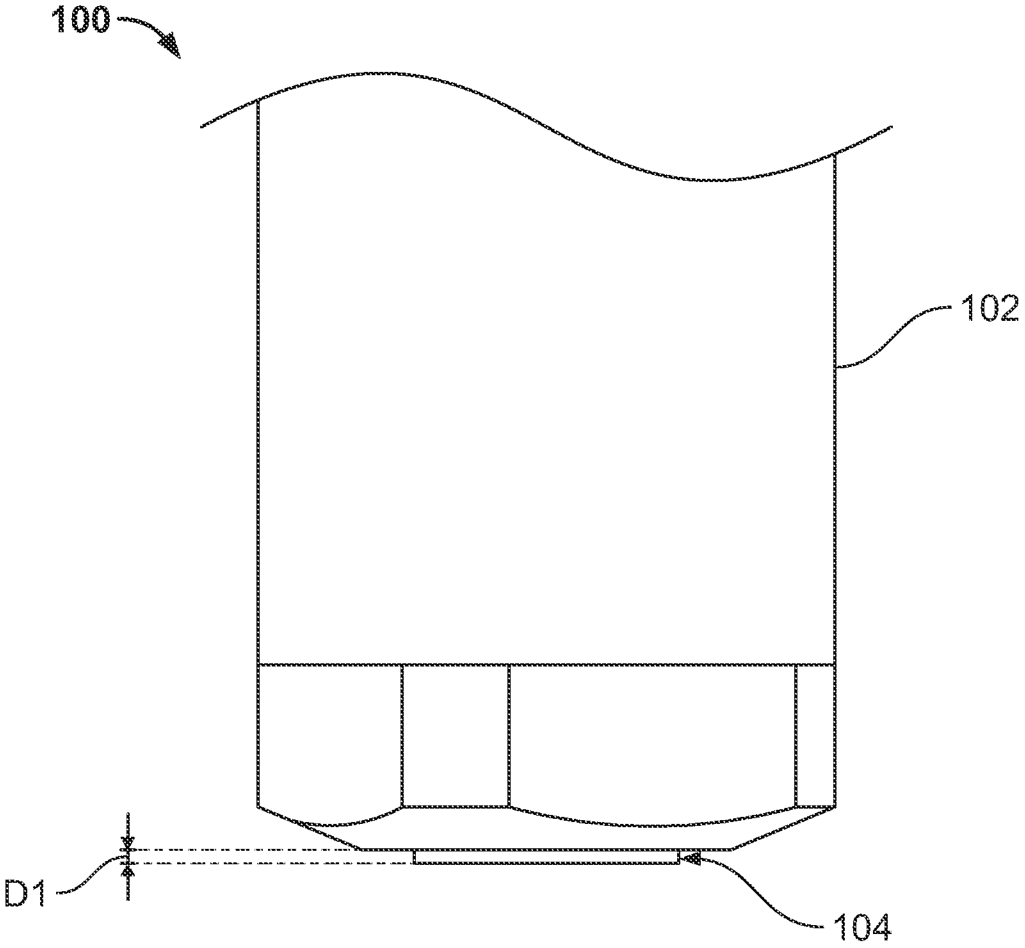
FIG. 4 shows a side elevational view of the fastener installation tool shown in FIG. 3 for installing a fastener, according to some embodiments.

FIG. 3 shows a perspective view of a fastener installation tool 100 for installing the fastener 10, according to some embodiments. FIG. 4 shows a side view of the fastener installation tool 100 for installing the fastener 10, according to some embodiments. In some embodiments, the fastener installation tool 100 includes a nosepiece 102 having a face 104. In some embodiments, the face 104 is configured to engage the head 42 of the sleeve 14 during installation of the fastener 10 to secure the workpieces 24, 26 together. In some embodiments, the face 104 is sized and shaped to correspond to a size and shape of the head 42 of the sleeve 14 to provide as much contact as possible between the face 104 and the head 42. In some embodiments, the face 104 is ring-shaped. In some embodiments, a center 107 of the face 104 is open for the fastener installation tool 100 to receive and engage with the second head 38 of the pin member 12 to install the fastener 10. In some embodiments, a geometry of the face 104 varies depending on a geometry of the head 42 of the sleeve 14. In some embodiments, the geometry of the face 104 is selected so that the face 104 makes contact with the head 42 in a manner that the face 104 prevents the head 42 from rotating. In some embodiments, the face 104 is planar. In some embodiments, the face 104 is smooth. In some embodiments, as used herein, the face 104 being "smooth" means that the face 104 does not include any nibs or other protrusions extending outwardly from the face 104 to engage with corresponding features in the sleeve 14.

In some embodiments, the face 104 is machined so that the machining tool leaves tool marks 106 in the face 104. In some embodiments, the tool marks 106 are circular in shape. In some embodiments, the marks are arcuate in shape. In some embodiments, the tool marks 106 increase frictional engagement between the face 104 and the head 42 of the sleeve 14 during installation of the fastener 10. In some embodiments, the configuration of the tool marks 106 can be other than circular or arcuate. In some embodiments, the tool marks 106 are oriented to maximize frictional engagement in a direction that prevents rotation of the head 42 of the sleeve 14 during installation of the fastener 10.

Figure 8:
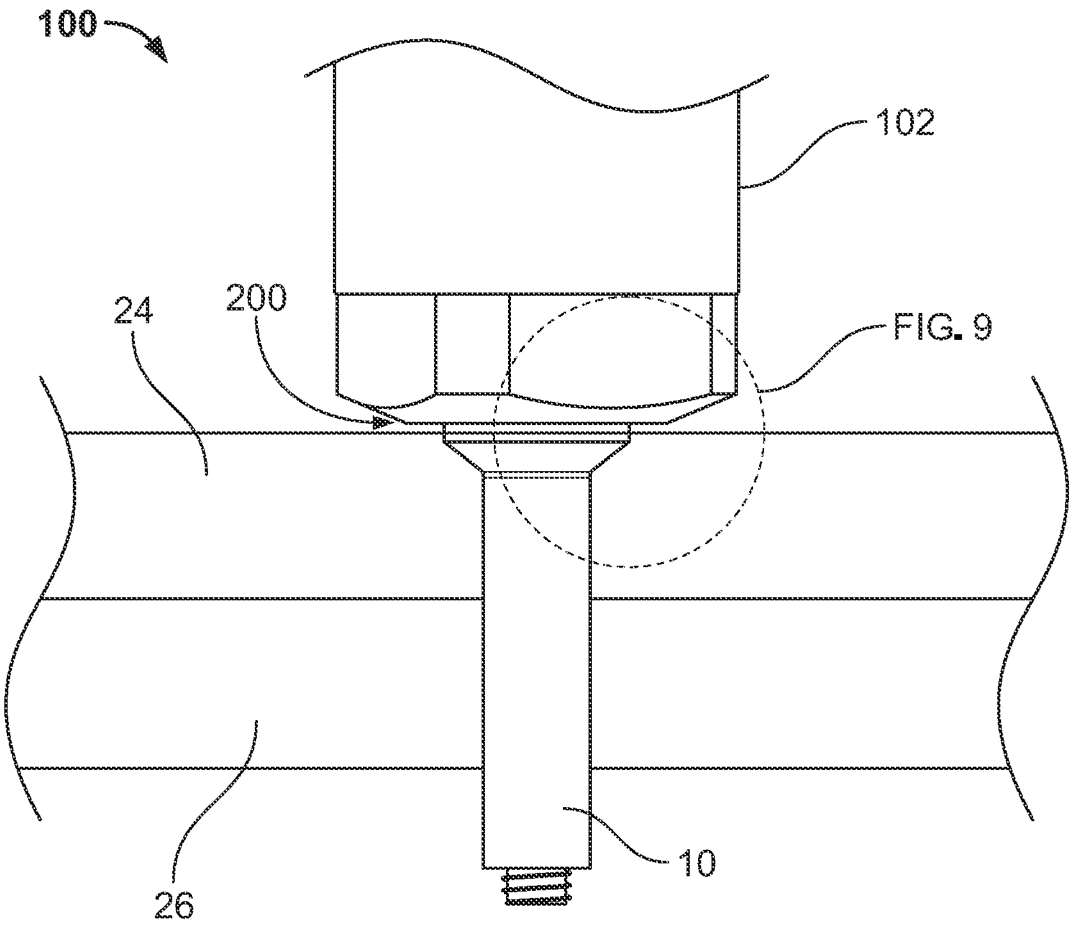
FIG. 8 shows the fastener installation tool shown in FIGS. 3 and 4 in use, according to some embodiments.

In some embodiments, the face 104 protrudes from the nosepiece 102 of the fastener installation tool 100 by a distance D1. In some embodiments, D1 is 125 μm. In some embodiments, D1 is greater than 125 μm. In some embodiments, the distance D1 is selected so that the face 104 contacts the fastener 10 but does not engage or otherwise contact the workpiece 24 during installation. FIG. 8 below shows some embodiments of the fastener installation tool 100 in use without contacting the workpiece 24.

In some embodiments, the nosepiece 102 is composed of aluminum. In some embodiments, the nosepiece 102 is composed of an aluminum alloy. In some embodiments, the nosepiece 102 is composed of a material which is known to have a high frictional coefficient when coupled with aluminum. In some embodiments, the nosepiece 102 is composed of the same material as the fastener 10. In some embodiments, when the nosepiece 102 is composed of aluminum or an aluminum alloy and the sleeve 14 of the fastener 10 is composed of aluminum or an aluminum alloy, a frictional coefficient between the face 104 and the fastener 10 can be maximized. In some embodiments, the frictional engagement may be such that the face 104 and the head 42 of the sleeve 14 are temporarily welded together due to the heat generated from the frictional engagement. In some embodiments, the frictional coefficient (μ) between the face 104 and the head 42 of the sleeve 14 is 0.5 to 2.

In some embodiments, the frictional coefficient (μ) between the face 104 and the head 42 is 0.5 to 1.9. In some embodiments, the frictional coefficient (μ) between the face 104 and the head 42 is 0.5 to 1.8. In some embodiments, the frictional coefficient (μ) between the face 104 and the head 42 is 0.5 to 1.7. In some embodiments, the frictional coefficient (μ) between the face 104 and the head 42 is 0.5 to 1.6. In some embodiments, the frictional coefficient (μ) between the face 104 and the head 42 is 0.5 to 1.5. In some embodiments, the frictional coefficient (μ) between the face 104 and the head 42 is 0.5 to 1.4. In some embodiments, the frictional coefficient (μ) between the face 104 and the head 42 is 0.5 to 1.3. In some embodiments, the frictional coefficient (μ) between the face 104 and the head 42 is 0.5 to 1.2. In some embodiments, the frictional coefficient (μ) between the face 104 and the head 42 is 0.5 to 1.1. In some embodiments, the frictional coefficient (μ) between the face 104 and the head 42 is 0.5 to 1. In some embodiments, the frictional coefficient (μ) between the face 104 and the head 42 is 0.5 to 0.9. In some embodiments, the frictional coefficient (μ) between the face 104 and the head 42 is 0.5 to 0.8. In some embodiments, the frictional coefficient (μ) between the face 104 and the head 42 is 0.5 to 0.7. In some embodiments, the frictional coefficient (μ) between the face 104 and the head 42 is 0.5 to 0.6.

In some embodiments, the frictional coefficient (μ) between the face 104 and the head 42 is 0.6 to 2. In some embodiments, the frictional coefficient (μ) between the face 104 and the head 42 is 0.7 to 2. In some embodiments, the frictional coefficient (μ) between the face 104 and the head 42 is 0.8 to 2. In some embodiments, the frictional coefficient (μ) between the face 104 and the head 42 is 0.9 to 2. In some embodiments, the frictional coefficient (μ) between the face 104 and the head 42 is 1 to 2. In some embodiments, the frictional coefficient (μ) between the face 104 and the head 42 is 1.1 to 2. In some embodiments, the frictional coefficient (μ) between the face 104 and the head 42 is 1.2 to 2. In some embodiments, the frictional coefficient (μ) between the face 104 and the head 42 is 1.3 to 2. In some embodiments, the frictional coefficient (μ) between the face 104 and the head 42 is 1.4 to 2. In some embodiments, the frictional coefficient (μ) between the face 104 and the head 42 is 1.5 to 2. In some embodiments, the frictional coefficient (μ) between the face 104 and the head 42 is 1.6 to 2. In some embodiments, the frictional coefficient (μ) between the face 104 and the head 42 is 1.7 to 2. In some embodiments, the frictional coefficient (μ) between the face 104 and the head 42 is 1.8 to 2. In some embodiments, the frictional coefficient (μ) between the face 104 and the head 42 is 1.9 to 2.

In some embodiments, the frictional coefficient (μ) between the face 104 and the head 42 is 0.5. In some embodiments, the frictional coefficient (μ) between the face 104 and the head 42 is 0.6. In some embodiments, the frictional coefficient (μ) between the face 104 and the head 42 is 0.7. In some embodiments, the frictional coefficient (μ) between the face 104 and the head 42 is 0.8. In some embodiments, the frictional coefficient (μ) between the face 104 and the head 42 is 0.9. In some embodiments, the frictional coefficient (μ) between the face 104 and the head 42 is 1. In some embodiments, the frictional coefficient (μ) between the face 104 and the head 42 is 1.1. In some embodiments, the frictional coefficient (μ) between the face 104 and the head 42 is 1.2. In some embodiments, the frictional coefficient (μ) between the face 104 and the head 42 is 1.3. In some embodiments, the frictional coefficient (μ) between the face 104 and the head 42 is 1.4. In some embodiments, the frictional coefficient (μ) between the face 104 and the head 42 is 1.5. In some embodiments, the frictional coefficient (μ) between the face 104 and the head 42 is 1.6. In some embodiments, the frictional coefficient (μ) between the face 104 and the head 42 is 1.7. In some embodiments, the frictional coefficient (μ) between the face 104 and the head 42 is 1.8. In some embodiments, the frictional coefficient (μ) between the face 104 and the head 42 is 1.9. In some embodiments, the frictional coefficient (μ) between the face 104 and the head 42 is 2. In some embodiments, the frictional coefficient (μ) between the face 104 and the head 42 is 2.1. In some embodiments, the frictional coefficient (μ) between the face 104 and the head 42 is 2.2. In some embodiments, the frictional coefficient (μ) between the face 104 and the head 42 is 2.3. In some embodiments, the frictional coefficient (μ) between the face 104 and the head 42 is 2.4. In some embodiments, the frictional coefficient (μ) between the face 104 and the head 42 is 2.5.

Figure 5:
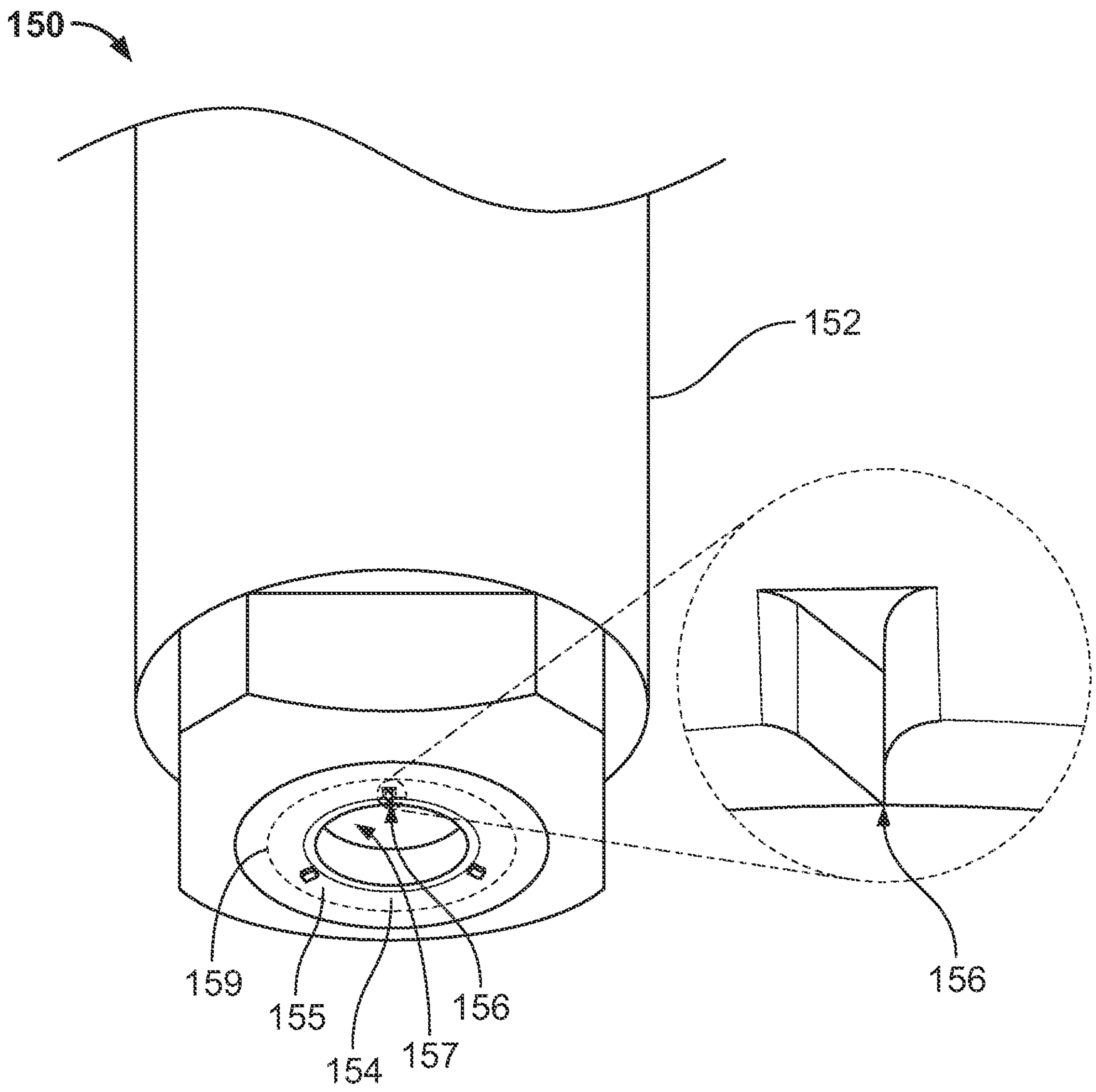
FIG. 5 shows a bottom perspective view of a fastener installation tool for installing a fastener, according to some embodiments.
Figure 6:
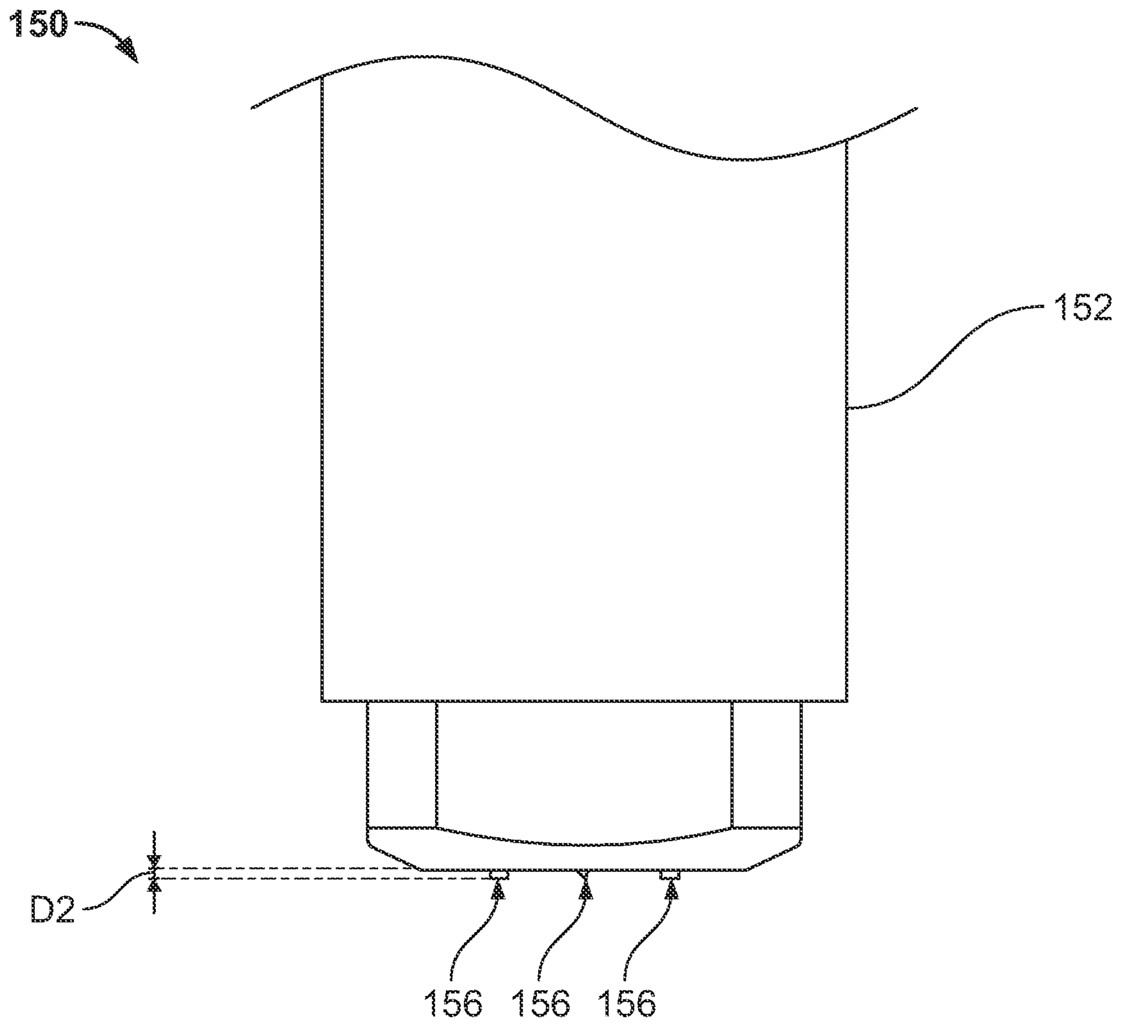
FIG. 6 shows a side elevational view of the fastener installation tool shown in FIG. 5 for installing a fastener, according to some embodiments.

FIG. 5 shows a perspective view of a fastener installation tool 150 for installing the fastener 10, according to some embodiments. FIG. 6 shows a side view of the fastener installation tool 150 for installing the fastener 10, according to some embodiments.

In some embodiments, the fastener installation tool 150 includes a nosepiece 152 having a face 154. In some embodiments, the face 154 is similar to the face 104 of the fastener installation tool 100 described above, with certain differences. In some embodiments, the face 154 includes an outer surface 155 and at least one protrusion 156 extending outwardly from the outer surface 155. In some embodiments, the face 154 includes a plurality of the protrusions 156. In some embodiments, the face 154 includes two of the protrusions 156. In some embodiments, the face 154 includes three of the protrusions 156. In some embodiments, the face 154 includes four of the protrusions 156. In some embodiments, the face 154 includes five of the protrusions 156. In some embodiments, the face 154 includes six of the protrusions 156. In some embodiments, the face 154 includes more than six of the protrusions 156. In some embodiments, each of the protrusions 156 has a tooth shape. In some embodiments, the protrusions 156 are circumferentially spaced apart from one another on the outer surface 155.

In some embodiments, the face 154 is configured to engage with the head 42 of the sleeve 14 during installation of the fastener 10 to secure the workpiece 24 and the workpiece 26 together. In some embodiments, the face 154 is sized and shaped to correspond to a size and shape of the head 42 of the sleeve 14 to provide as much contact as possible between the face 154 and the head 42.

In some embodiments, the face 154 is ring-shaped as a center 157 of the face 154 is open for the fastener installation tool 150 to receive and engage with the second head 38 to install the fastener 10. In some embodiments, a geometry of the face 154 can vary depending on a geometry of the head 42 of the sleeve 14. In some embodiments, the geometry of the face 154 is selected such that the face 154 makes contact with the head 42 of the sleeve 14 in a manner that the face 154 prevents the head 42 from rotating. In some embodiments, the face 154 does not include any features that engage with recesses in the fastener 10. In some embodiments, the face 154 does not include any nibs for engaging corresponding recesses in the fastener 10.

In some embodiments, the face 154 is machined so that a machining tool leaves tool marks 159 in the face 154. In some embodiments, each of the tool marks 159 is circular in shape. In some embodiments, each of the tool marks 159 is arcuate in shape. In some embodiments, the tool marks 159 increase the frictional engagement between the face 154 and the head 42 of the sleeve during installation of the fastener 10. In some embodiments, the configuration of the tool marks 159 can be other than circular or arcuate. In some embodiments, the tool marks 159 can be oriented to maximize frictional engagement in a direction that prevents rotation of the head 42 of the sleeve 14 during installation of the fastener 10. In some embodiments, the tool marks 159 are microscopic ridges.

In some embodiments, the face 154 protrudes from the fastener installation tool 150 a distance D2. In some embodiments, the distance D2 is 125 μm. In some embodiments, the distance D2 is at least 125 μm. In some embodiments, D2 is 125 μm to 500 μm. In some embodiments, the distance D2 is selected such that the face 154 contacts the fastener 10 but does not engage or otherwise contact the workpiece 24 during installation. In some embodiments, the fastener installation tool 150 functions similarly to the fastener installation tool 100 and would likewise not contact the workpiece 24, as shown in FIG. 8.

In some embodiments, the nosepiece 152 is composed of material that is harder than that of the sleeve 14 of the fastener 10, so that the protrusion 156 is able to pierce, and form an indentation in, the sleeve 14 of the fastener 10. In some embodiments, the nosepiece 152 of the fastener installation tool 150 is composed of a first material. In some embodiments, the sleeve 14 is composed of a second material. In some embodiments, the first material is harder than the second material. In some embodiments, the first material of the nosepiece 152 is steel. In some embodiments, the first material of the nosepiece 152 is hardened steel. In some embodiments, the first material of the nosepiece 152 is aluminum. In some embodiments, the first material of the nosepiece 152 is an aluminum alloy. In some embodiments, the second material of the sleeve 14 of the fastener 10 is aluminum. In some embodiments, the second material of the sleeve 14 of the fastener 10 is aluminum alloy. In some embodiments, the second material of the sleeve 14 of the fastener 10 is stainless steel. In some embodiments, the second material of the sleeve 14 of the fastener 10 is A286 (AISI 660) steel. In some embodiments, the A286 steel is an austenitic precipitation hardening stainless steel. In some embodiments, the second material of the sleeve 14 is nickel-copper alloy. In some embodiments, the protrusion 156 is configured to reduce a reliance on frictional engagement between the face 154 and the fastener 10.

Figure 7:
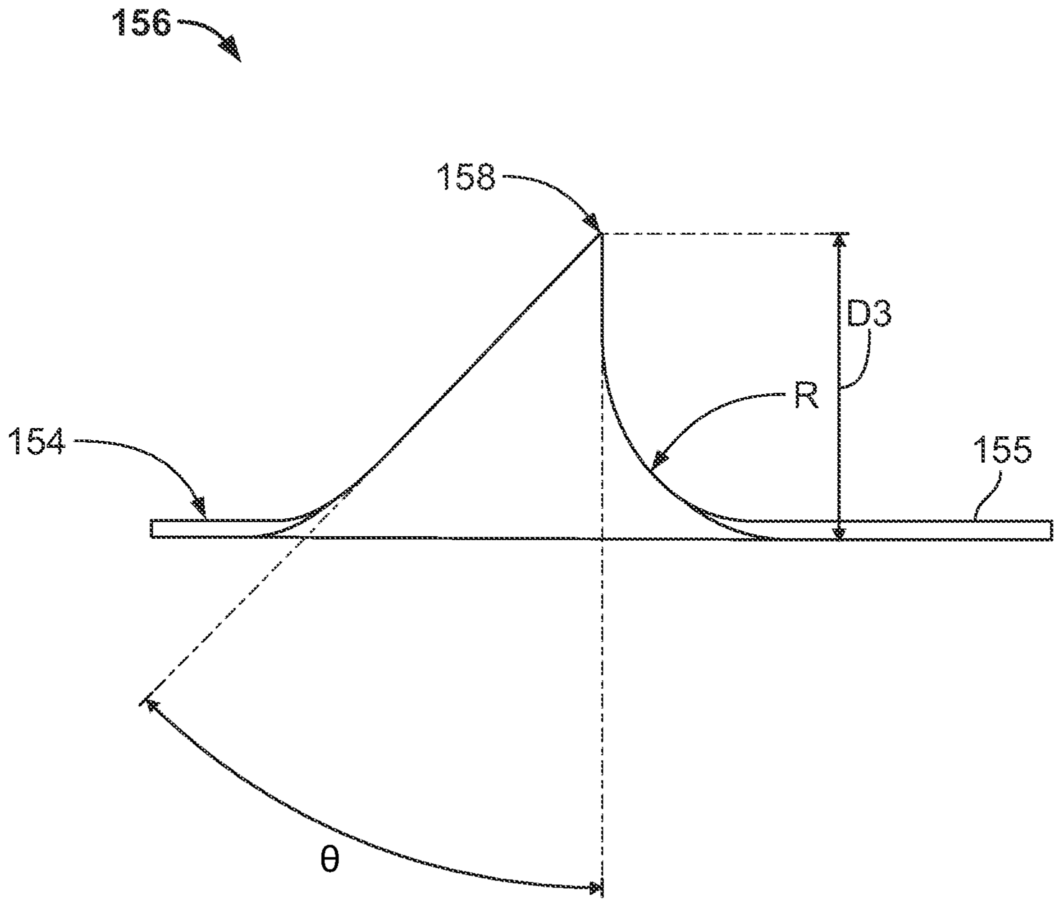
FIG. 7 shows an enlarged, partial view of the fastener installation tool shown in FIG. 5, according to some embodiments.

With reference to FIG. 7, in some embodiments, the protrusion 156 extends a distance D3 from the surface 155 of the face 154. In some embodiments, the distance D3 is 300 μm to 500 μm.

In some embodiments, the distance D3 is 300 μm to 490 μm. In some embodiments, the distance D3 is 300 μm to 480 μm. In some embodiments, the distance D3 is 300 μm to 470 μm. In some embodiments, the distance D3 is 300 μm to 460 μm. In some embodiments, the distance D3 is 300 μm to 450 μm. In some embodiments, the distance D3 is 300 μm to 440 μm. In some embodiments, the distance D3 is 300 μm to 430 μm. In some embodiments, the distance D3 is 300 μm to 420 μm. In some embodiments, the distance D3 is 300 μm to 410 μm. In some embodiments, the distance D3 is 300 μm to 400 μm. In some embodiments, the distance D3 is 300 μm to 390 μm. In some embodiments, the distance D3 is 300 μm to 380 μm. In some embodiments, the distance D3 is 300 μm to 370 μm. In some embodiments, the distance D3 is 300 μm to 360 μm. In some embodiments, the distance D3 is 300 μm to 350 μm. In some embodiments, the distance D3 is 300 μm to 340 μm. In some embodiments, the distance D3 is 300 μm to 330 μm. In some embodiments, the distance D3 is 300 μm to 320 μm. In some embodiments, the distance D3 is 300 μm to 310 μm.

In some embodiments, the distance D3 is 310 μm to 500 μm. In some embodiments, the distance D3 is 320 μm to 500 μm. In some embodiments, the distance D3 is 330 μm to 500 μm. In some embodiments, the distance D3 is 340 μm to 500 μm. In some embodiments, the distance D3 is 350 μm to 500 μm. In some embodiments, the distance D3 is 360 μm to 500 μm. In some embodiments, the distance D3 is 370 μm to 500 μm. In some embodiments, the distance D3 is 380 μm to 500 μm. In some embodiments, the distance D3 is 390 μm to 500 μm. In some embodiments, the distance D3 is 400 μm to 500 μm. In some embodiments, the distance D3 is 410 μm to 500 μm. In some embodiments, the distance D3 is 420 μm to 500 μm. In some embodiments, the distance D3 is 430 μm to 500 μm. In some embodiments, the distance D3 is 440 μm to 500 μm. In some embodiments, the distance D3 is 450 μm to 500 μm. In some embodiments, the distance D3 is 460 μm to 500 μm. In some embodiments, the distance D3 is 470 μm to 500 μm. In some embodiments, the distance D3 is 480 μm to 500 μm. In some embodiments, the distance D3 is 490 μm to 500 μm.

In some embodiments, a size of the protrusion 156 can be selected to provide an indentation in the head 42 of the sleeve that has a depth of less than 200 μm. In some embodiments, the depth can be greater than 50 μm. In some embodiments, the depth of the indentation formed is 50 μm to 200 μm. In some embodiments, the depth of the indentation formed is 50 μm to 190 μm. In some embodiments, the depth of the indentation formed is 50 μm to 180 μm. In some embodiments, the depth of the indentation formed is 50 μm to 170 μm. In some embodiments, the depth of the indentation formed is 50 μm to 160 μm. In some embodiments, the depth of the indentation formed is 50 μm to 150 μm. In some embodiments, the depth of the indentation formed is 50 μm to 140 μm. In some embodiments, the depth of the indentation formed is 50 μm to 130 μm. In some embodiments, the depth of the indentation formed is 50 μm to 120 μm. In some embodiments, the depth of the indentation formed is 50 μm to 110 μm. In some embodiments, the depth of the indentation formed is 50 μm to 100 μm. In some embodiments, the depth of the indentation formed is 50 μm to 90 μm. In some embodiments, the depth of the indentation formed is 50 μm to 80 μm. In some embodiments, the depth of the indentation formed is 50 μm to 70 μm. In some embodiments, the depth of the indentation formed is 50 μm to 60 μm.

In some embodiments, the depth of the indentation formed is 60 μm to 200 μm. In some embodiments, the depth of the indentation formed is 70 μm to 200 μm. In some embodiments, the depth of the indentation formed is 80 μm to 200 μm. In some embodiments, the depth of the indentation formed is 90 μm to 200 μm. In some embodiments, the depth of the indentation formed is 100 μm to 200 μm. In some embodiments, the depth of the indentation formed is 110 μm to 200 μm. In some embodiments, the depth of the indentation formed is 120 μm to 200 μm. In some embodiments, the depth of the indentation formed is 130 μm to 200 μm. In some embodiments, the depth of the indentation formed is 140 μm to 200 μm. In some embodiments, the depth of the indentation formed is 150 μm to 200 μm. In some embodiments, the depth of the indentation formed is 160 μm to 200 μm. In some embodiments, the depth of the indentation formed is 170 μm to 200 μm. In some embodiments, the depth of the indentation formed is 180 μm to 200 μm. In some embodiments, the depth of the indentation formed is 190 μm to 200 μm.

In some embodiments, the protrusion 156 includes a tip 158. In some embodiments, the tip 158 is configured to be pointed. In some embodiments, the tip 158 is pointed or sharp. In some embodiments, the tip 158 has a radius R. In some embodiments, the tip 158 is formed to have an angle θ relative to a normal direction from the surface 155 of the face 154. In some embodiments, the angle θ is 30° to 60°. In some embodiments, the angle θ is 40° to 50°. In some embodiments, the angle θ is 45°.

In some embodiments, the fastener installation tool 150 is configured to be more resistant to contamination of either the face 154 or the head 42 of the sleeve 14 prior to installation than the fastener installation tool 100. In some embodiments, contamination on the surface of head 42 or the face 104 can impact the frictional engagement between the surfaces such that the fastener installation tool 100 is unable to maintain the head 42 in place during installation. In some embodiments, the fastener installation tool 150 is configured to be less susceptible to such contamination due to the protrusion 156. In some embodiments, the depth of the indentation formed is sufficiently small, such that the indentation may be removed (e.g., the surface of head 42 of the sleeve 14 smoothed) during preparation of the fastener 10 for painting or the like.

Figure 9:
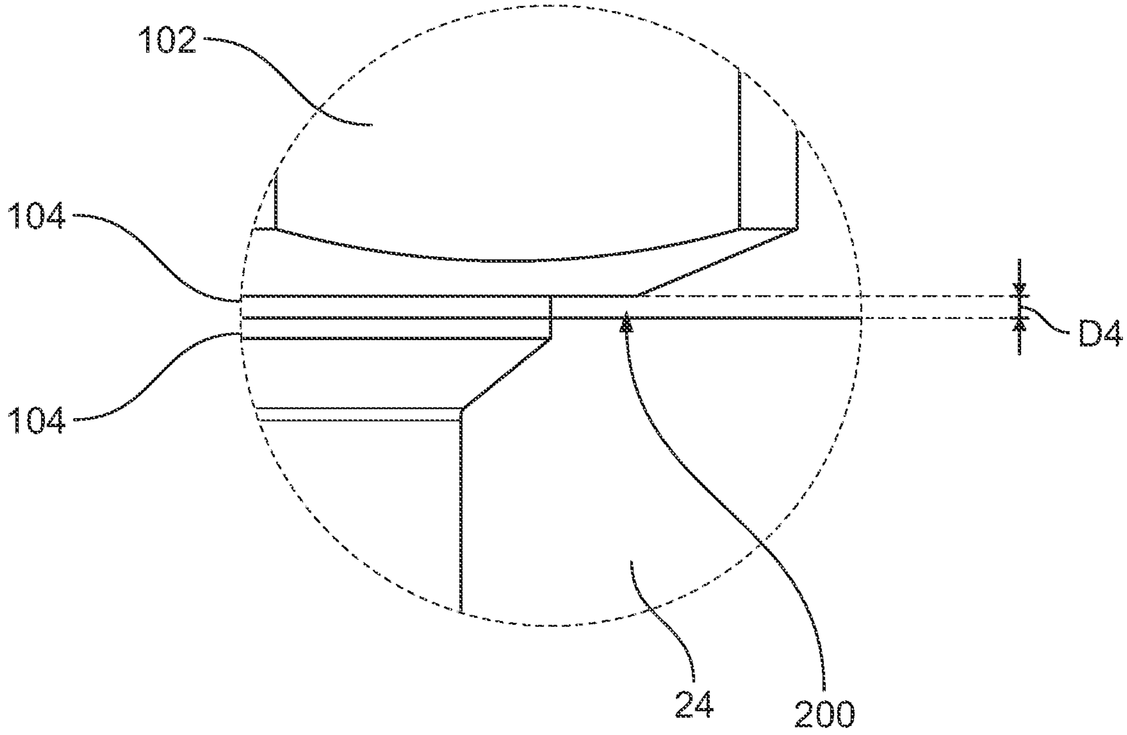
FIG. 9 shows a partial side view of the fastener installation tool shown in FIGS. 3 and 4 in use, according to some embodiments.

FIG. 8 shows a side view of the fastener installation tool 100 in a process of installing the fastener 10, according to some embodiments. FIG. 9 shows a partial side view of the fastener installation tool 100 in the process of installing the fastener 10, according to some embodiments. Reference will be made to FIGS. 8 and 9 collectively, unless specific reference is made otherwise.

For simplicity of this specification, FIG. 8 shows the fastener installation tool 100. In some embodiments, it is to be appreciated that the description is applicable for the fastener installation tool 100 or the fastener installation tool 150, but the description will not be repeated for the fastener installation tool 150 for simplicity of this specification.

In some embodiments, a space 200 is maintained between the nosepiece 102 and the workpiece 24. In some embodiments, the space 200 spans a distance D4 between the nosepiece 102 and the workpiece 24. In some embodiments, the distance D4 is 125 μm. In some embodiments, the distance D4 is at least 125 μm. In some embodiments, D4 is 125 μm to 500 μm. In some embodiments, the space 200 enables installation of the fastener 10 to be flush with a surface of the workpiece 24 while the fastener 10 is planar and does not include any recesses and the fastener installation tool 100 cannot damage the workpiece 24 because the workpiece 24 is not contacted by the fastener installation tool 100.

In some embodiments, a system includes the fastener 10 and the fastener installation tool 100. In some embodiments, a system includes the fastener 10 and the fastener installation tool 150.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A system, comprising:
a fastener including,
a sleeve having
a tubular portion, wherein the tubular portion includes an internal threaded portion having an internal thread, and
a head,
wherein the head of the sleeve includes a first planar surface,
wherein the first planar surface has no recesses therein,
wherein the head of the sleeve is configured to be installed in an accessible hole in a workpiece having a surface, and
a pin member having
a threaded portion, wherein the threaded portion includes an external thread,
wherein the pin member is configured to be disposed within the sleeve, and
wherein the external thread of the pin member is configured to threadedly engage the internal thread of the sleeve; and
a fastener installation tool including
a nosepiece having
a face, and
at least one protrusion extending from the face,
wherein the at least one protrusion includes
a tip,
wherein the tip extends from the face by a first distance,
a first side extending from the face to the tip, wherein the first side is radiused, and
a second side extending from the face to the tip, wherein the second side extends at an angle of 30° to 60° relative to a normal direction from the face of the nosepiece, and
wherein the at least one protrusion is configured to engage and removably embed within the first planar surface of the head of the sleeve to prevent the sleeve from rotating relative to the workpiece.

2. The system of claim 1, wherein the at least one protrusion includes a plurality of protrusions.

3. The system of claim 2, wherein the plurality of protrusions includes at least two of the protrusions.

4. The system of claim 2, wherein the plurality of protrusions includes at least three to at least six protrusions.

5. The system of claim 4, wherein the plurality of protrusions is circumferentially spaced from one another.

6. The system of claim 1, wherein the first distance is 300 μm to 500 μm.

7. The system of claim 1, wherein the tip is pointed.

8. The system of claim 1, wherein the nosepiece of the fastener installation tool is composed of a first material, and wherein the sleeve is composed of a second material.

9. The system of claim 8, wherein the first material is harder than the second material.

10. The system of claim 8, wherein the first material is aluminum.

11. The system of claim 8, wherein the first material is an aluminum alloy.

12. The system of claim 8, wherein the first material is steel.

13. The system of claim 8, wherein the second material is aluminum.

14. The system of claim 8, wherein the second material is an aluminum alloy.

15. The system of claim 8, wherein the second material is stainless steel.

16. The system of claim 8, wherein the second material is a nickel-copper alloy.

17. A system, comprising:
a fastener including,
a sleeve having a head,
wherein the head includes a planar surface,
wherein the head is configured to be installed in an accessible hole in a workpiece, and
a pin member configured to be disposed within the sleeve; and a fastener installation tool including
a nosepiece having
a face, and
at least one protrusion extending from the face,
wherein the at least one protrusion includes
a tip,
wherein the tip extends from the face by a first distance,
a first side extending from the face to the tip, wherein the first side is radiused, and
a second side extending from the face to the tip, wherein the second side extends at an angle of 30° to 60° relative to a normal direction from the face of the nosepiece, and
wherein the at least one protrusion is configured to engage and removably embed within the planar surface of the head of the sleeve to prevent the sleeve from rotating relative to the workpiece.

18. The system of claim 17, wherein the at least one protrusion includes a plurality of protrusions.

19. The system of claim 17, wherein the nosepiece of the fastener installation tool is composed of a first material, and wherein the sleeve is composed of a second material.

20. The system of claim 19, wherein the first material is harder than the second material.

* * * * *